(12) United States Patent
Satou et al.

(10) Patent No.: US 6,488,007 B2
(45) Date of Patent: Dec. 3, 2002

(54) CONTROLLER FOR CONTROLLING AN INTERNAL COMBUSTION ENGINE IN EMERGENCY DRIVING

(75) Inventors: Masahiro Satou, Saitama (JP); Ken Ogawa, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/921,533

(22) Filed: Aug. 3, 2001

(65) Prior Publication Data

US 2002/0020391 A1 Feb. 21, 2002

(30) Foreign Application Priority Data

Aug. 3, 2000 (JP) ........................................ 2000-236057

(51) Int. Cl.[7] ................................................ F02D 7/00
(52) U.S. Cl. ........................................ 123/396; 123/399
(58) Field of Search ................................ 123/396, 399, 123/395, 319, 403

(56) References Cited

U.S. PATENT DOCUMENTS 5,983,859 A * 11/1999 Bruedigam et al. ......... 123/396

6,267,099 B1 * 7/2001 Yamada et al. ............. 123/396

FOREIGN PATENT DOCUMENTS

| JP | 11-148406 | 6/1999 |
| JP | 11-022531 | 11/1999 |

* cited by examiner

*Primary Examiner*—Bibhu Mohanty
(74) *Attorney, Agent, or Firm*—Lahive & Cockfield, LLP

(57) ABSTRACT

A controller for an internal combustion engine detects a demand variable showing a demand from a driver, and controls an intake air volume to the internal combustion engine according to the detected demand variable. When trouble is detected in a system controlling the intake air volume, the controller switches a driving control of a vehicle to a emergency driving mode. In the emergency driving mode, the controller keeps the intake air volume to the internal combustion engine constant. The controller calculates a emergency driving control variable according to the detected demand variable, and controls the driving of the vehicle according to the calculated emergency driving control variable. The emergency driving control variable is a control variable different from the intake air volume. Thus, in the emergency driving mode, the driving of the vehicle can be controlled by the control variable different from the intake air volume, and a better drivability is ensured.

19 Claims, 11 Drawing Sheets

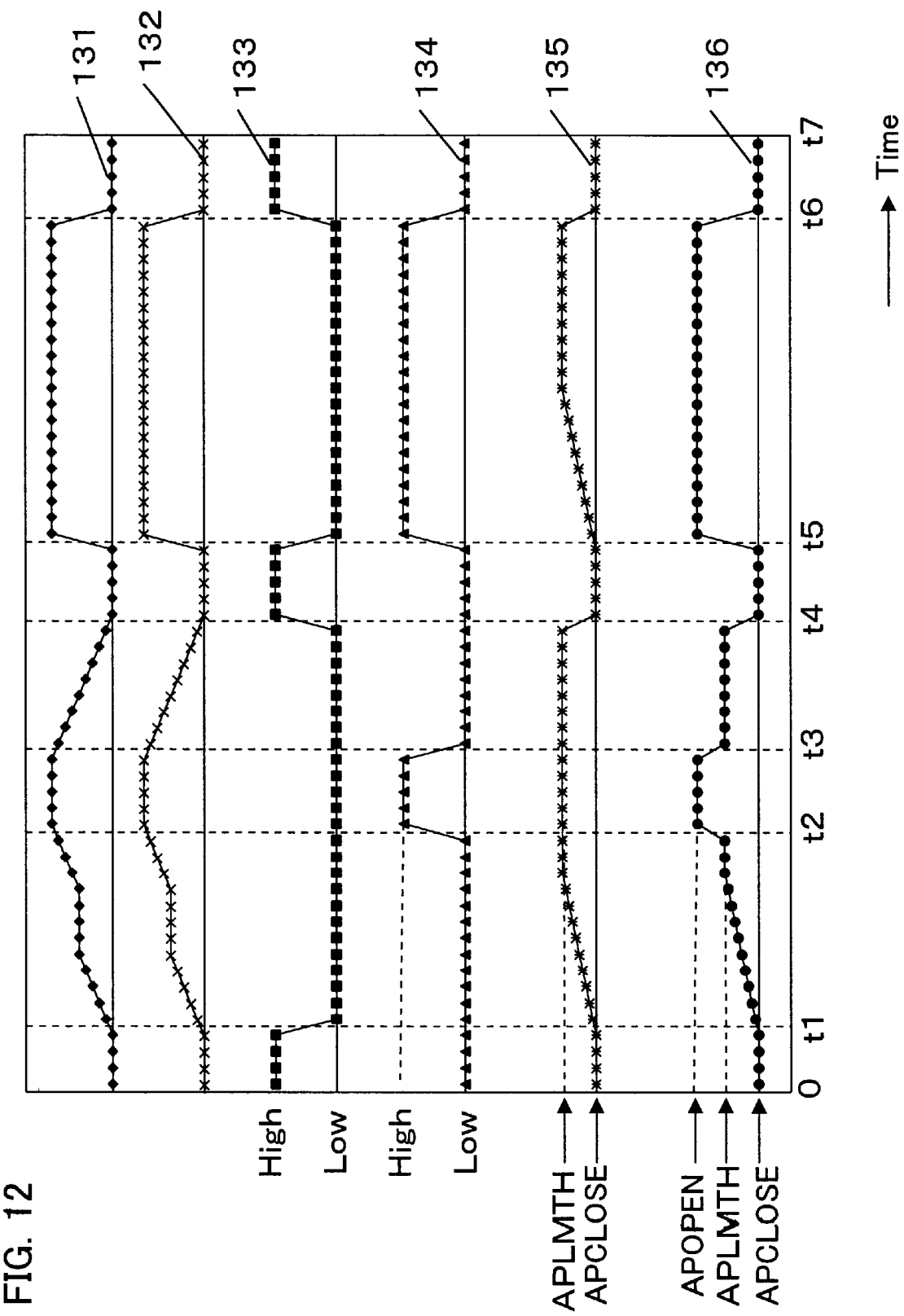

CONTROLLER FOR CONTROLLING AN INTERNAL COMBUSTION ENGINE IN EMERGENCY DRIVING

TECHNICAL FIELD

The invention relates to a controller for an internal combustion engine that can control a vehicle according to demand of a driver, even when a system for electronically controlling a throttle valve has trouble resulting in malfunctioning.

BACKGROUND OF THE INVENTION

A control system for electronically controling opening and closing of a throttle valve is well known. Such a control system is generally called a DBW (drive by wire) control system. When the system has trouble, it is impossible to accurately control the throttle valve. Even when trouble has arisen, it is desirable that a minimum driving capability is ensured to move the vehicle to a safe turnout place or to a repair shop.

A mechanism has been proposed, which keeps the opening of the throttle valve constant to enable the vehicle to run when the control system has trouble. For example, the throttle valve controller disclosed in Japanese Patent Laid-Open No. 11-148406 has two kinds of turnout opening degrees for the throttle valve depending on whether the vehicle is in an idling state or not. After trouble has been caused in the throttle control system, if the accelerator opening detected is a first degree (for example, about 20%) or more that is sufficiently smaller than full opening degree, the throttle valve is set at the first degree. On the other hand, if the accelerator opening corresponds to that of the idling state or less, the throttle valve is set at a second degree (for example, a few percents) that is an opening with which air is introduced for keeping the engine in the idling state. The throttle valve controller has means that controls the ignition timing or the fuel supply volume to prevent the engine speed from becoming larger than a predetermined upper limit when trouble is encountered, the upper limit being sufficiently smaller than the permissible maximum rotational speed.

On the other hand, a gasoline internal combustion engine of a cylinder direct injection type has been proposed recently. The internal combustion engine of the direct injection type is switched between the uniform combustion and the stratified combustion. In the uniform combustion, the fuel is injected at the intake stroke and is diffused into the combustion chamber so that a homogeneous mixture is formed. In the stratified combustion, the fuel is injected at the compression stroke, forming a laminar mixture that is intensive around the ignition plug. In the case of the direct injection system, the range of the air fuel ratio allowing combustion is widened, and therefore, it is possible to minutely control the driving force generated by the engine by changing the air fuel ratio.

As a fail-safe measure to cope with situations where an internal combustion engine of a direct injection type has trouble, Japanese Patent Laid-Open No. 11-22531 describes a controller that judges permission to. switching to the stratified combustion mode. Specifically, the above-described controller has software means and a hardware judging circuit for judging permission to switching to the stratified combustion based on input signal relating to the engine operating conditions. Only when permission judgments of both of the above described software means and hardware judging circuit coincide, switching to the stratified combustion is allowed. According to this controller, when trouble has arisen, the throttle valve is fully closed, and switching from the stratified combustion to the uniform combustion is forcibly performed. At this moment, the air fuel ratio is set to the theoretical air fuel ratio or a lean air fuel ratio. Thus, deterioration of drivability due to undesired switching to the stratified combustion is avoided.

In the case of the throttle valve controller as shown in Japanese Patent Laid-Open No. 11-148406, when trouble has arisen in the control system for controlling the throttle opening, the area of the opening of the throttle is fixed, keeping the intake air volume to the engine constant. Thus, a driver cannot control the driving force generated by the engine. Furthermore, if an upper limit is provided to the engine rotational speed to regulate the rise of the engine rotational speed, the driver cannot control the driving force to be generated by the engine as well. Accordingly, for driving at the time of trouble, drivability becomes minimum.

Furthermore, as shown in Japanese Patent Laid-Open No. 11-22531, if the switching to the stratified combustion is prohibited and the target air fuel ratio is set at the theoretical air fuel ratio (14.7) or at a lean air fuel ratio (>14.7), the degree of flexibility to meet the demand of the driver is low if minimum drivability is ensured.

SUMMARY OF THE INVENTION

It is an object of the invention to enable a driver to control the driving force generated by the engine improving drivability, even when the system controlling the intake air volume to the internal combustion engine has trouble.

According to one aspect of the invention, the controller of an internal combustion engine detects demand variable indicating the demand of the driver, and controls the intake air volume to the internal combustion engine according to the detected demand variable. When trouble is detected in the system controlling the intake air volume, the controller switches the control of the vehicle to a turnout or emergency driving mode. In the emergency driving mode, the controller keeps the intake air volume to the internal combustion engine constant. Furthermore, the controller calculates the emergency driving control variable according to the above described detected demand variable, and controls the driving of the vehicle according to the above described calculated emergency driving control variable. Here, the emergency driving control variable is a control variable different from the above described intake air volume. Thus, in the emergency driving mode, it becomes possible to control the vehicle by a control variable different from the intake air volume ensuring a better drivability.

In one embodiment of the invention, the emergency driving control variable is the target air fuel ratio. The controller determines the target air fuel ratio from an air fuel ratio map provided for the emergency driving mode based on the detected demand variable and detected engine rotational speed.

In one embodiment of the invention, the above described demand variable is the opening or the degree of depression of the accelerator pedal. The controller calculates the intake air volume to the internal combustion engine according to the detected depression of the accelerator pedal. Based on the calculated intake air volume, the opening of the throttle valve is controlled by a throttle valve actuator. When the system controlling the intake air volume has a problem and when switching to the emergency driving mode takes place, the opening of the throttle valve is fixed at a full close or a nearly full close.

In another embodiment of the invention, the above described demand variable is the required torque according to the rotational speed of the internal combustion engine and to the opening of the accelerator pedal.

According to another aspect of the invention, the controller of an internal combustion engine has an accelerator pedal sensor that continuously detects the position of the accelerator pedal and an accelerator pedal switch that non-continuously detects the position of the accelerator pedal. When it is determined that the accelerator pedal sensor is not in trouble, the demand variable from the driver is calculated on the basis of the opening of the accelerator pedal detected by the accelerator pedal sensor. When it is determined that the accelerator pedal sensor is in trouble, the demand variable from the driver is estimated on the basis of the position of the accelerator pedal detected by the accelerator pedal switch. Thus, even when trouble has arisen in the accelerator pedal sensor, it is possible to realize a drivability that is nearly equal to that realized based on the demand from the driver.

In one embodiment of the invention, the accelerator pedal switch includes a full close switch that detects the full close state of the accelerator pedal. In another embodiment of the invention, the accelerator pedal switch includes not only the full close switch but also a full open switch that detects the full open state of the accelerator pedal.

According to another aspect of the invention, the internal combustion engine is a gasoline internal combustion engine of a cylinder injection system. The gasoline internal combustion engine of a direct injection system has an air fuel ratio of a wide range at which the engine can run. Accordingly, even when trouble has arisen, it is possible to minutely control the air fuel ratio, avoiding lowering of drivability.

BRIEF DESCRIPTION OF THE DRAWINGS

FIG. 12 is a graph showing depression of the accelerator pedal, the demand variable based on the accelerator pedal sensor, the state of the full close and full open switches, the accelerator opening estimated from the full close switch, and the accelerator opening estimated from the full close and full open switches, according to one embodiment of the invention.

DETAILED DESCRIPTION OF THE PREFERRED EMBODIMENTS

Figure 1:
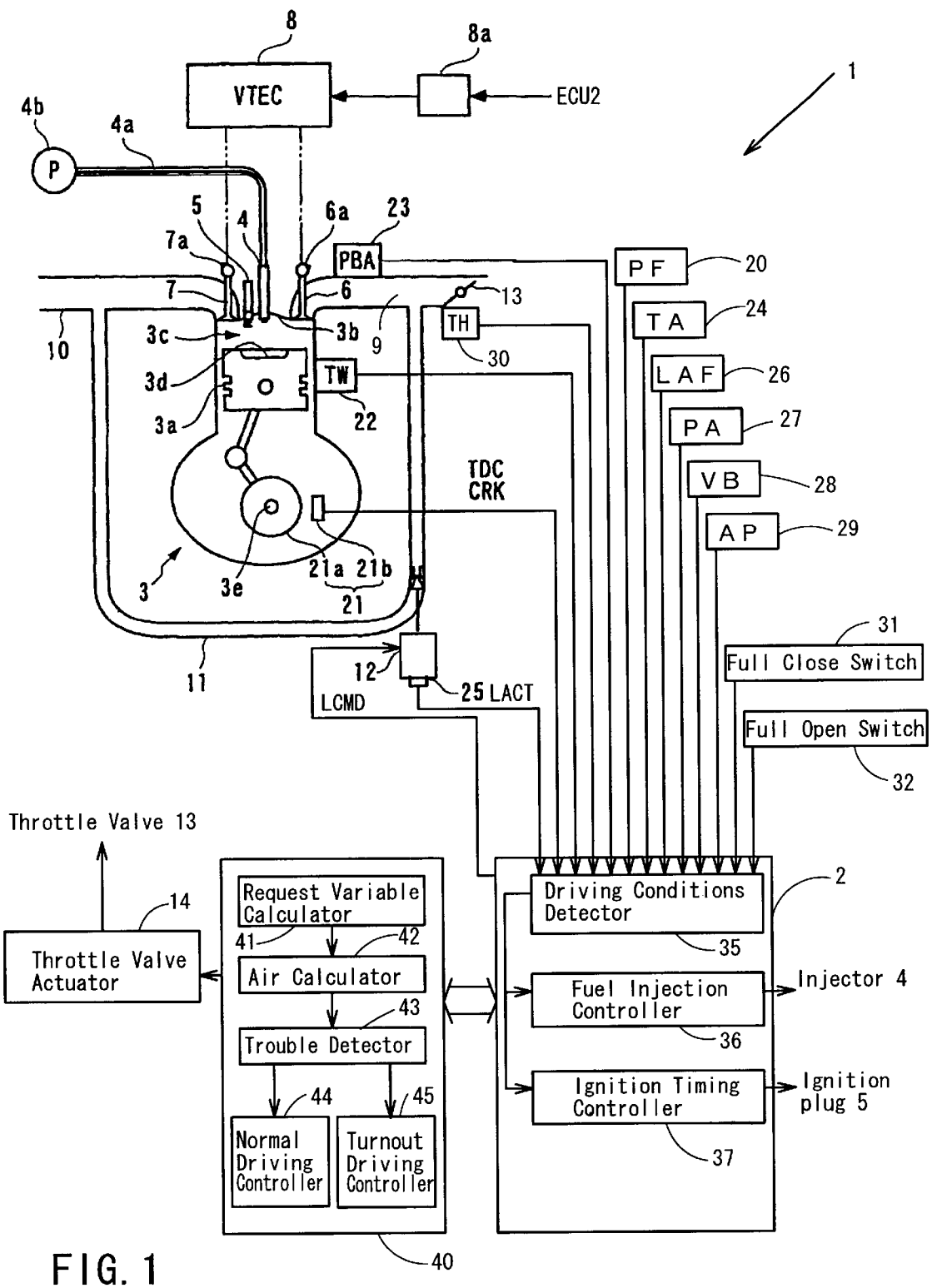
FIG. 1 is a block diagram showing a structure of a controller of an internal combustion engine according to one embodiment of the invention.

FIG. 1 is a block diagram showing a rough structure of a controller 1 of an internal combustion engine according to one embodiment of the invention. The controller 1 includes an engine 3, and an engine electronic controller (engine controller), that is, an engine ECU 2. The engine ECU 2 is composed of a microcomputer and related circuit elements. The ECU 2 has an input interface for receiving detected signals from various kinds of sensors 20 to 30, a central processing unit (hereafter, referred to simply as [CPU]), a ROM (read only memory) for storing programs to be executed and data, a RAM (random access memory) for providing work areas at the time of execution and for storing the calculation results or the like, and an output interface for sending control signals to various engine parts. In FIG. 1, on the basis of such a hardware structure, the engine ECU 2 is shown by functional blocks.

The engine 3 shown in FIG. 1 is a gasoline engine of a straight four-cylinder type (in FIG. 1, only one cylinder is shown) of a cylinder direct injection type. Between a piston 3a of each cylinder and a cylinder head 3b, a combustion chamber 3c is formed. At the central part on the upper surface of the piston 3a, a recess 3d is formed. To the cylinder head 3b, a fuel injection valve (hereafter, called an injector) 4 and an ignition plug 5 are attached, facing the combustion chamber 3c.

The injector 4 is provided at the central top part of the combustion chamber 3c. To the injector 4, a high-pressure pump 4b is connected through a fuel pipe 4a. The fuel from a fuel tank (not shown in the drawing) is pressurized to a high pressure by the pump 4b, and after that, it is supplied to the injector 4 where the pressure is controlled by a regulator (not shown in the drawing). The fuel is injected toward the recess 3d of the piston 3a from the injector 4, and meets the upper surface of the piston 3a having the recess 3d, forming a fuel jet. Especially, in the case of the stratified combustion, most of the fuel injected from the injector 4 meets the recess 3d to form a fuel jet.

A fuel pressure sensor 20 is attached near the injector 4 of the fuel pipe 4a. The sensor 20 detects the fuel pressure PF of the fuel injected by the injector 4, and sends detection signal to a driving conditions detecting part 35 of the ECU 2. The ignition plug 5 is supplied with a high voltage and discharges at a timing corresponding to the ignition timing, which ignites the mixture in the combustion chamber 3c.

An intake cam 6a and an exhaust cam 7a that drive an intake valve 6 and an exhaust valve 7 of each cylinder respectively are each composed of a low speed cam and a high speed cam, the high speed cam having a cam nose higher than that of the low speed cam. A valve timing switching mechanism (hereafter, called a VTEC) 8 with an oil pressure control valve 8a for controlling supply of the oil pressure to the VTEC 8 is provided to the engine 3.

The valve timing is changed between the timing for the lean and stratified combustion, and the timing for the stoichiometry (theoretical A/F ratio) and rich combustion. At the time of the stoichiometry and rich combustion, the valve opening and closing timing of the intake valve 6 (or the exhaust valve 7) becomes faster and the valve lift amount becomes larger than those of the timing at the lean and stratified combustion.

A magnet rotor 21a is attached to a crankshaft 3e of the engine 3. The magnet rotor 21a composes a crank angle sensor 21 together with an MRE pickup 21b. The crank angle sensor 21 sends CRK and TDC signals to the driving conditions detection part 35 of the ECU 2 in accordance with the rotation of the crankshaft 3e. The CRK signal comprises pulses each generated at a predetermined crank angle (for example, 30 degrees). The driving conditions detection part 35 determines the engine rotational speed NE of the engine 3 (hereafter, referred to simply as the engine rotational speed) on the basis of the CRK signal. The TDC signal indicates that the piston 3a is positioned at a predetermined crank angle near the TDC (top dead center) at the start of the intake stroke. In the case of an engine of the four-cylinder type, the TDC pulse is generated pulse for every crank angle of 180 degrees.

A cylinder-distinguishing sensor (not shown in the drawing) is provided to the engine 3. The cylinder-distinguishing sensor sends a cylinder distinguishing signal to the driving conditions detection part 35. The driving conditions detecting part 35 determines at which stroke and at which crank angle the piston 3a is positioned with respect to each cylinder based on the cylinder distinguishing signal, CRK signal, and TDC signal.

A throttle valve 13 is provided to an intake pipe 9 of the engine 3. A throttle valve opening sensor 30 is provided to the throttle valve 13. The throttle valve opening sensor 30 detects the opening degree TH of the throttle valve 13, and sends its output to the driving conditions detecting part 35.

A water temperature sensor 22 is provided to the main body of the engine 3. The sensor 22 is composed of a thermistor. It detects the engine water temperature TW that is the temperature of the cooling water circulating in the main body of the engine 3, and sends its output to the driving conditions detecting part 35.

On the downstream side of the throttle valve 13 of the intake pipe 9, an intake pipe absolute pressure sensor 23 is provided. The sensor 23 is composed of a semiconductor pressure sensor or the like. It detects the intake pipe absolute pressure PBA that is the absolute pressure in the intake pipe 9, and sends its output to the driving conditions detecting part 35.

An intake air temperature sensor 24 is attached to the intake pipe 9. The sensor 24 is composed of a thermistor. It detects the intake air temperature TA in the intake pipe 9, and sends its output to the driving conditions detecting part 35.

The engine 3 has an EGR pipe 11 that is connected to the downstream side of the throttle valve 13 of the intake pipe 9 and to the upstream side of a catalyst (not shown in the drawing) in the exhaust pipe 10. The EGR pipe 11 practices the EGR for lowering NOx in the exhaust gas, by re-circulating the exhaust gas of the engine 3 to the intake side to lower the combustion temperature in the combustion chamber 3c.

An EGR control valve 12 is attached to the EGR pipe 11. The valve 12 is a linear electromagnetic valve, and according to the driving signal from the ECU 2, its lift amount is linearly changed. Thus, the EGR pipe 11 can be opened and closed. A valve lift sensor 25 is attached to the EGR control valve 12. The sensor 25 detects the actual valve lift amount LACT of the EGR control valve 12, and sends its output to the driving conditions detecting part 35.

The ECU 2 calculates the target valve lift amount LCMD of the EGR control valve 12 according to the driving conditions of the engine 3. The ECU 2 controls the EGR rate so that the actual valve lift amount LACT reaches the target valve lift amount LCMD.

On the upstream side of the catalyst of the exhaust pipe 10, a full range air fuel ratio (LAF) sensor 26 is provided. The LAF sensor 26 comprises Zirconia and platinum electrode or the like. The LAF sensor 26 linearly detects the oxygen content in the exhaust gas in a wide air/fuel ratio zone, from the rich zone where the air/fuel ratio is richer than the theoretical air/fuel ratio to an extremely lean zone. It sends a detected signal proportional to the above described oxygen content to the driving conditions detecting part 35.

An atmospheric pressure sensor 27 is attached to the engine 3. The sensor 27 comprises a semiconductor pressure sensor or the like. It detects the atmospheric pressure PA, and sends its output to the ECU 2. A battery voltage sensor 28 is connected to the ECU 2. The sensor 28 detects the voltage value VB of a battery (not shown in the drawing) that supplies the driving voltage to the injector 4, and sends its output to the driving conditions detecting part 35.

An accelerator pedal sensor 29 is provided to the vehicle. The sensor 29 detects the stamping stroke AP (hereafter, called an accelerator opening) of the accelerator pedal, and sends its output to the driving conditions detecting part 35.

A full close switch 31 and a full open switch 32 may be provided to the accelerator pedal. The full close switch 31 detects the state where the accelerator pedal is not depressed (full close state), and the full open switch 32 detects the state where the depression stroke of the accelerator pedal is maximum (full open state). The detected full close and full open states are communicated to the driving conditions detecting part 35 by means of detection signals.

A fuel injection control part 36 of the ECU 2 refers to a three-dimensional map stored in a ROM (not shown in the drawing) on the basis of the intake pipe pressure PBA and the engine rotational speed NE communicated from the driving conditions detecting part 35, and determines the basic injection time of the fuel. The fuel injection control part 36 multiplies the basic injection time by a correction factor, and determines the final fuel injection time. Here, the correction factor is a factor for correction for realizing a proper air/fuel ratio according to the driving conditions of the engine. The correction factor is calculated on the basis of detection signals from various kinds of sensors 20 to 30 (hereafter, these detected signals are named generally engine related parameters). The injector 4 is kept in the open state through the final fuel injection time.

Furthermore, the fuel injection control part 36 performs switching between the stratified combustion state and the uniform combustion state. In the stratified combustion state, the fuel is injected during the compression stroke and is burned at an air/fuel ratio extremely leaner (for example, 27 to 60) than the theoretical air/fuel ratio, while in the uniform combustion state, the fuel is injected during the intake stroke and is burned at an air/fuel ratio richer (for example, 12 to 27) than that of the stratified combustion state, by controlling the fuel injection time. Which combustion mode is to be taken among the stratified combustion, lean combustion, stoichiometry combustion, and rich combustion is determined, for example, on the basis of the required torque (which is determined from the accelerator opening and the engine rotational speed) and the engine rotational speed NE.

The ignition timing control part 37 corrects the ignition timing determined by the engine rotational speed NE and the intake pipe pressure PBA communicated from the driving conditions detecting part 35 by multiplying a correction factor based on the above mentioned engine related parameters, thereby determining the optimum ignition timing.

The throttle valve actuator 14 controls the opening of the throttle valve 13 according to the target intake air volume communicated from a driving controller 40. The throttle valve actuator 14 can be realized, for example, by the above-mentioned DBW. An EICV (electrical idle control valve) or an EACV (electrical air control valve) may be provided to the throttle valve actuator 14. The EICV or EACV may be provided at a passage (not shown in the figure) in the intake pipe 9 that bypasses the throttle valve. The EICV and EACV can control the intake air volume supplied to the engine by continuously changing the passage area through which the air in the bypass passage passes during the time when the throttle valve is closed.

The driving controller 40 may be composed of a microcomputer and circuit elements. Specifically, the driving controller 40 is an electronic controller (ECU) having a processor (CPU), a read only memory (ROM) for storing programs and data, a random access memory (RAM) for providing an operational work area and a temporary storage area, and an input/output interface. In this embodiment, the driving controller 40 is electrically connected to the engine ECU 2, and it is shown to receive the offer of various kinds of data from the engine ECU 2. However, it is also possible that an driving conditions detecting part is provided to the driving controller 40 so that the driving controller 40 may obtain the data necessary for the driving control directly from various kinds of sensors.

The driving controller 40 has a demand variable calculating part 41, an intake air volume calculating part 42, trouble existence detecting part 43, a normal driving control part 44, and a emergency driving control part 45. The demand variable calculating part 41 receives a detected signal showing the accelerator opening AP from the driving conditions detecting part 35, and sets the above described accelerator opening AP to the demand variable.

In another embodiment, the demand variable calculating part 41 calculates the demand variable, taking into consideration not only the accelerator opening AP but also other engine related parameters. For example, it receives the engine rotational speed NE from the driving conditions detecting part 35, and determines the required torque on the basis of the engine rotational speed NE and the accelerator opening AP. The required torque is set as a demand variable.

The intake air volume calculating part 42 calculates the target intake air volume to be supplied to the engine 3, according to the demand variable determined by the demand variable calculating part 41. The calculated target intake air volume is sent to the throttle valve actuator 14. Thus, the throttle valve actuator 14 controls the opening of the throttle valve 13 according to the target intake air volume.

The trouble existence detecting part 43 checks whether any trouble has arisen or not in the intake air volume control system that controls the intake air volume to the engine 3. In this embodiment, the intake air volume control system includes at least an intake air volume calculating part 42, a throttle valve actuator 14, a throttle valve 13, and a throttle valve opening sensor 30. The above described EICV and EACV may be included in the intake air volume control system.

When any trouble has arisen in the intake air volume control system, a value of 1 is set at the control system trouble flag by trouble detector (not shown in the drawing). The trouble detecting part 43 judges whether trouble has arisen or not in the intake air volume control system, by checking the value of the control system trouble flag.

In another embodiment, the trouble detecting part 43 determines whether trouble has arisen or not, not only in the intake air volume control system but also in various other systems in the vehicle. For example, when a trouble detector provided to the engine ECU 2 or to the driving controller 40 detects trouble, a value of 1 is set to a trouble flag corresponding to the detected trouble. The trouble detecting part 43 checks the trouble flags, and determines existence of trouble. Different flags are used according to kinds of trouble and places of trouble. Thus, the driving mode is shifted to the emergency driving for fail-safe based on one or more trouble flags. The trouble detecting part 43 detects existence of trouble by checking the trouble flags.

When it is determined that no trouble has arisen by the trouble detecting part 43, the driving of the vehicle is controlled by the normal driving control part 44. The normal driving control part 44 retrieves an air fuel ratio map for the normal driving on the basis of the demand variable calculated by the demand variable calculating part 41 and the engine rotational speed NE received from the driving conditions detecting part 35, and determines the target air fuel ratio. The above described determined target air fuel ratio is transferred to the fuel injection control part 36. The fuel injection control part 36 determines the final fuel injection time on the basis of the intake pipe pressure PBA and the engine rotational speed NE by such a method as mentioned above so that the received target air fuel ratio be realized.

When it is determined that trouble has arisen by the trouble detecting part 43, the driving of the vehicle is controlled by the emergency driving control part 45. The emergency driving is a driving mode that is practiced when a trouble exists in the vehicle. The emergency driving according to the invention is practiced to satisfy the demand of the driver as much as possible, that is, to avoid deterioration of drivability.

The emergency driving control part 45 drives the intake air volume control system to keep the intake air volume constant. Next, the emergency driving control part 45 calculates the emergency driving control variable according to the demand variable calculated by the demand variable calculating part 41. The emergency driving is practiced according to the above described calculated emergency driving control variable. Here, the emergency driving control variable is a control variable different from the intake air volume.

In this embodiment, an air fuel ratio is used as the emergency driving control variable. Specifically, the emergency driving control part 45 retrieves the emergency driving air fuel ratio map, and determines the target air fuel ratio corresponding to the accelerator opening AP and the engine rotational speed NE. The determined target air fuel ratio is transferred to the fuel injection control part 36. The fuel injection control part 36 determines the final fuel injection timing on the basis of the intake pipe pressure PBA and the engine rotational speed NE received from the driving conditions detecting part 35 to realize the received target air fuel ratio.

As to the emergency driving control variable, it is also possible to use another control variable of an internal combustion engine such as the ignition timing, the valve lift amount of an EGR control valve, or the control variable of a variable valve timing mechanism (VTEC). In this case, these control variables are set in advance as parameters depending on the accelerator opening. When the accelerator opening is received from the driving conditions detecting part 35, a control variable corresponding to the above described accelerator opening is calculated, and the emergency driving is practiced according to the above described calculated control variable.

Figure 2:
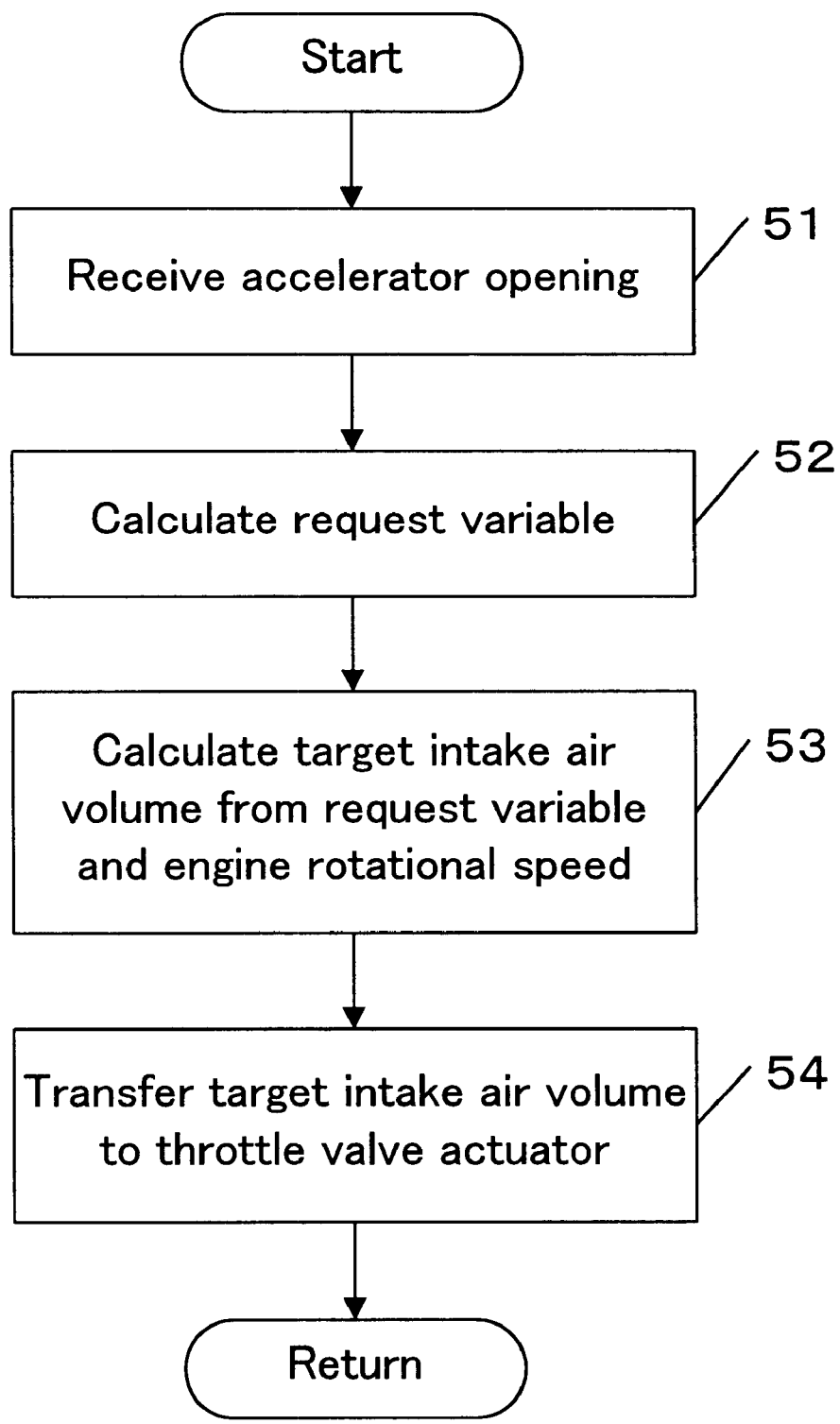
FIG. 2 is a flow chart showing a calculation of a demand variable and a control of an intake air volume according to one embodiment of the invention.

FIG. 2 is a flow chart showing a procedure of a calculation of a demand variable and an intake air volume control that are practiced by the demand variable calculating part 41 and the intake air volume control means 42. This routine is practiced at constant time intervals (for example, ten ms)

At step 51, an accelerator opening AP is received from the driving conditions detecting part 35, and the above described accelerator opening AP is set to the demand variable (step 52). Based on the demand variable obtained like this and the engine rotational speed NE received from the driving conditions detecting part 35, a map (not shown in the drawing) is retrieved, and the target intake air volume is determined (53). The target intake air volume is sent to the throttle valve actuator 14 (54). The throttle valve actuator 14 controls the opening of the throttle valve 13 according to the target intake air volume.

Figure 3:
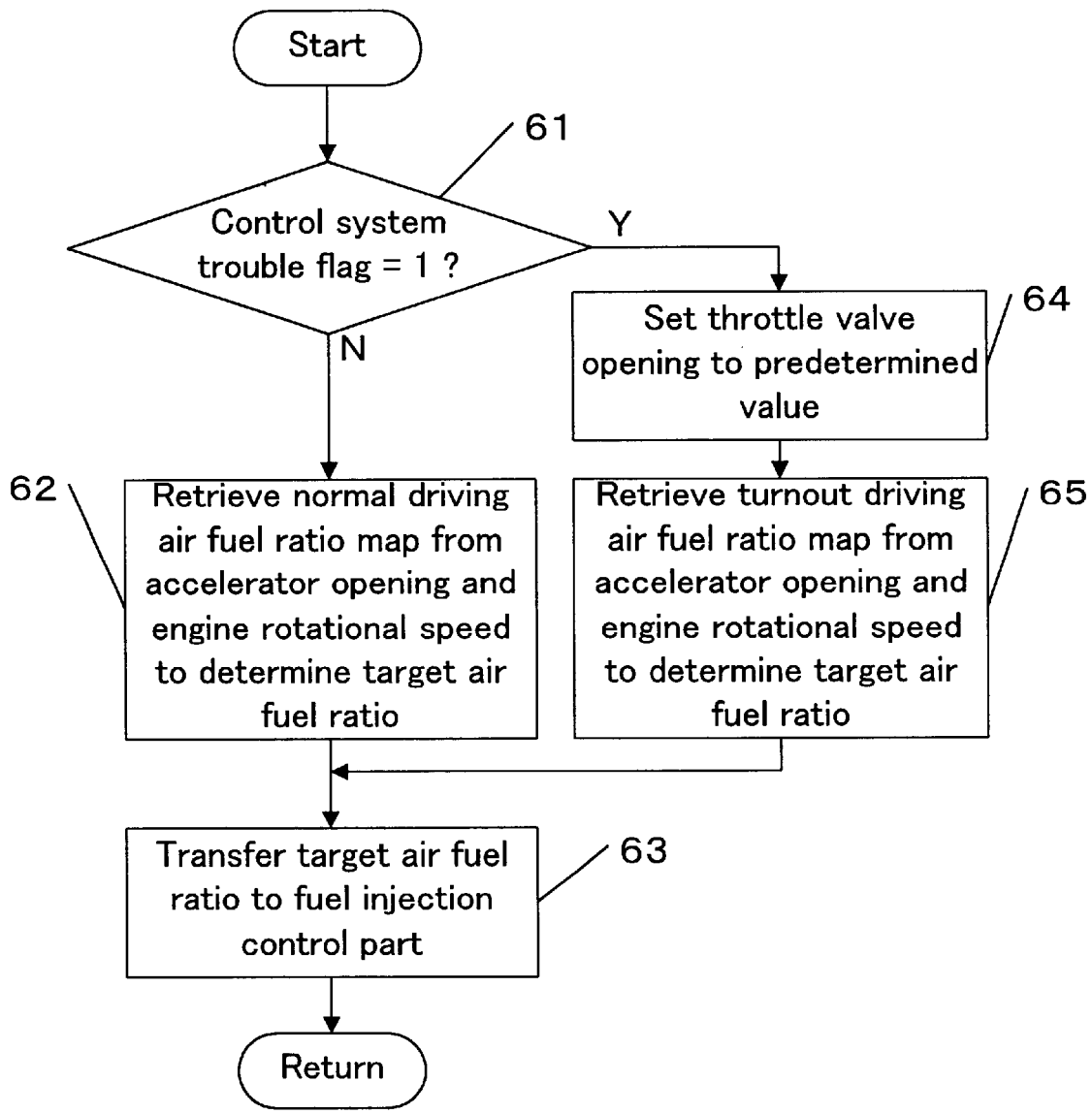
FIG. 3 is a flow chart showing a switching control between a normal driving and a emergency driving according to one embodiment of the invention.

FIG. 3 is a flow chart showing a switching procedure between a normal driving and a emergency driving, which is practiced by the trouble detecting part 43. This routine is carried out, for example, each time a TDC signal is outputted. The TDC signal is outputted four times while the crankshaft rotates two times in the case of a four-cylinder engine.

At step 61, the control system trouble flag is checked, where a value of 1 is set when trouble is detected in the intake air volume control system. If a value of 1 is not set at the control system trouble flag, it means a state where no trouble has arisen in the intake air volume control system. Advancing to step 62, the air fuel ratio map (FIG. 4A) for the normal driving is retrieved from the accelerator opening AP and the engine rotational speed NE, and the target air fuel ratio is determined. Advancing to step 63, the determined target air fuel ratio is transferred to the fuel injection control part 36.

At step 61, if a value of 1 is set to the control system trouble flag, it means a state where trouble has arisen in the intake air volume control system. Advancing to step 64, the throttle valve opening is fixed at a previously determined value (for example, a value of full close or nearly full close) Alternatively, it may also be set at a different throttle valve opening according to the kind of trouble.

Advancing to step 65, an air fuel ratio map (FIG. 4B) for the emergency driving is retrieved on the basis of the accelerator opening AP and the engine rotational speed NE, and the target air fuel ratio is determined (65). The target air fuel ratio is transferred to the fuel injection control part 36 (63).

Figure 4:
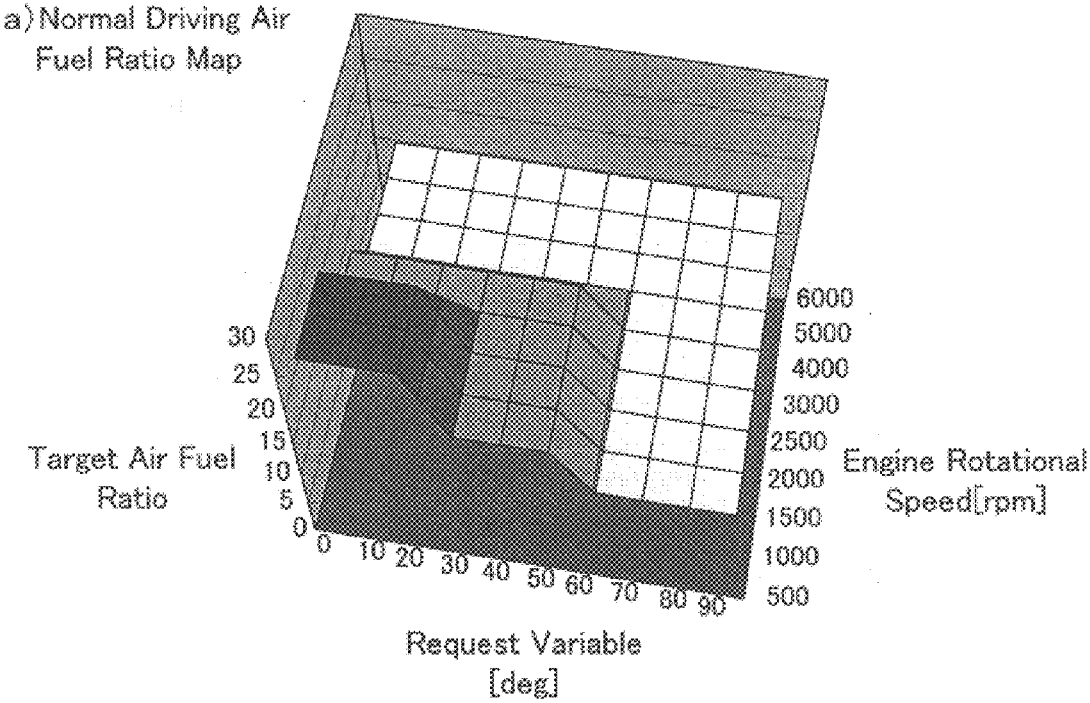
FIG. 4 is a view showing (a) an air fuel ratio map for the normal driving and (b) an air fuel ratio map for the emergency driving according to one embodiment of the invention.
Figure 4:
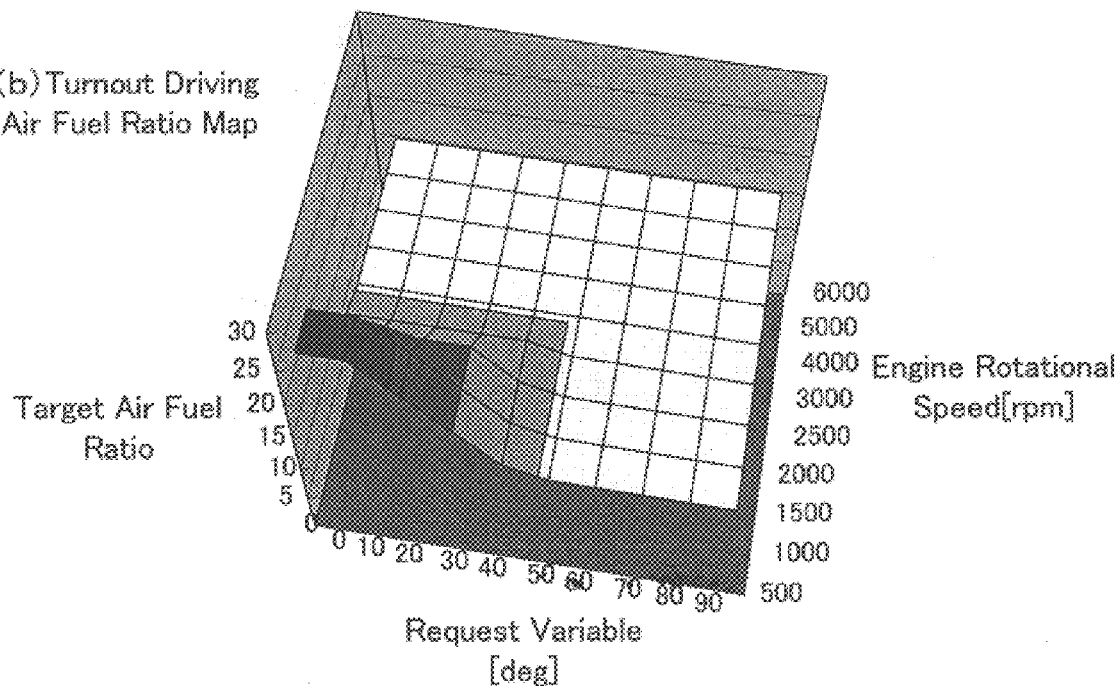

FIG. 4A shows a target air fuel ratio map for the normal driving that is referred to at step 62 in FIG. 3, and FIG. 4B shows a target air fuel ratio map for the emergency driving that is referred to at step 65 in FIG. 3. The maps shown in FIGS. 4A and 4B are applied to an engine of the direct injection system.

In the normal driving, the opening of the throttle valve is controlled so that the target intake air volume corresponding to the accelerator opening is supplied to the engine. On the other hand, the target air fuel ratio is determined from the accelerator opening (expressed by [demand variable] in the map) and the engine rotational speed according to the air fuel ratio map shown in FIG. 4A. As mentioned above, the fuel injection time is calculated on the basis of the intake pipe pressure and the engine rotational speed to realize the above described determined target air fuel ratio. Thus, the driving is controlled according to the demand from the driver.

In the emergency driving, as mentioned above, the opening of the throttle valve is fixed at a value of full close or nearly full close so that the intake air volume is kept constant, regardless of the value of the accelerator opening. The target air fuel ratio is determined from the accelerator opening and the engine rotational speed according to the air fuel ratio map shown in FIG. 4B. As described above, the fuel injection time is calculated on the basis of the intake pipe pressure and the engine rotational speed to realize the determined target air fuel ratio. In the emergency driving, the intake air volume is kept constant, and therefore, the intake pipe pressure does not reflect the demand of the driver. However, as shown in FIG. 4B, the target air fuel ratio is set according to the accelerator opening. As a result, the vehicle is controlled according to the demand from the driver.

Thus, even in the emergency driving where the intake air volume is kept constant, driving which conforms to the demand of the driver becomes possible by the use of an air fuel ratio map where an air fuel ratio depending on the accelerator opening is specified. The driver can control the driving force generated by the engine, and accordingly lowering of drivability can be restrained.

As apparent by comparing FIG. 4A with FIG. 4B, the air fuel ratio map for the emergency driving is set so that the lean zone is less than that for the normal driving. In a normal driving, air is introduced into the engine according to the accelerator opening, which ensures drivability even in the lean zone. In the emergency driving, the throttle opening is fixed at a value of full close or nearly full close, introducing less air into the engine.

It is also possible to carry out a switching of the driving as described above with an engine of the port injection type. In this case, a different air fuel ratio map is set. In the case of an engine of the port injection type, the range of the air fuel ratio at which the combustion is possible is narrower than that of the engine of the direct injection type. Air fuel ratio map needs to be defined taking into consideration of such narrower range.

Figure 5:
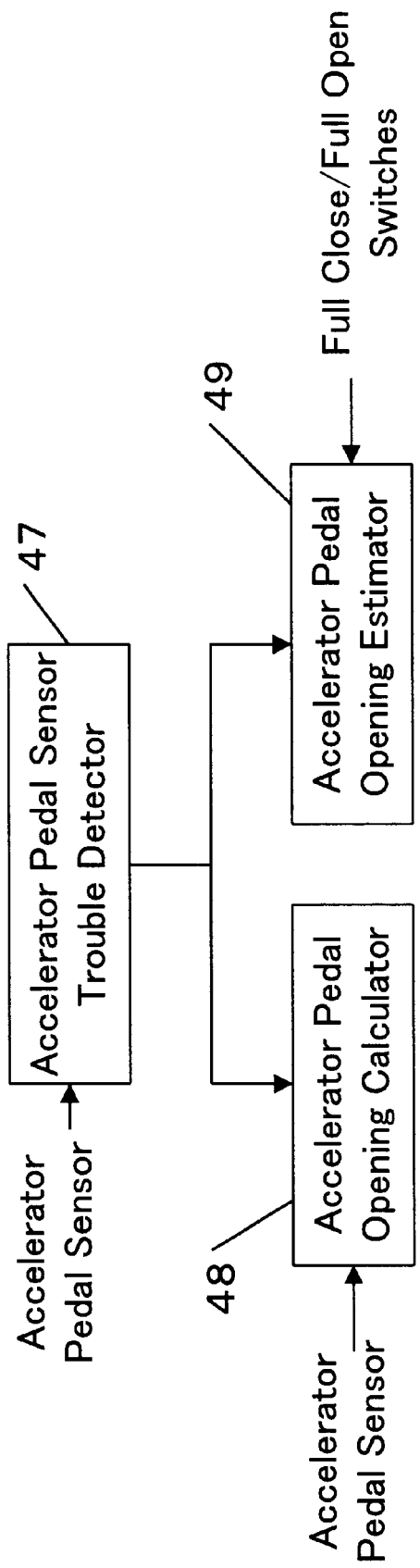
FIG. 5 is a block diagram showing the detail of demand variable calculator according to one embodiment of the invention.

FIG. 5 is a block diagram showing the details of demand variable calculator 41 shown in FIG. 1. The demand variable calculator 41 has a detector 47 for detecting trouble or failure of the accelerator pedal sensor, a calculator 48 for calculating accelerator pedal opening, and an estimator 49 for estimating accelerator pedal opening. Typically, computer programs stored in a memory medium such as a ROM, a magnetic disk, an optical disk, and a nonvolatile memory realize these functional blocks. Alternatively, it is also possible to build hardware to practice the functions of these functional blocks.

The detector 47 for detecting accelerator pedal sensor trouble determines whether trouble has arisen in the accelerator pedal sensor or not. When it is determined that no trouble has arisen in the accelerator pedal sensor, the demand variable is calculated by the accelerator pedal opening calculator 48. When it is determined that trouble has arisen in the accelerator pedal sensor, the accelerator pedal opening estimator 49 estimates the demand variable.

The accelerator pedal opening calculator 48 receives an accelerator opening AP from the accelerator pedal sensor 29 through the driving conditions detecting part 35, and sets the accelerator opening AP to the demand variable.

The accelerator pedal opening estimator 49 receives a detection signal indicating a full close or full open state via the driving conditions detecting part 35 as sensed by the full close switch 31 and/or the full open switch 32 provided on the accelerator pedal. It estimates the accelerator opening AP on the basis of the detection signal.

In another embodiment, a mechanism that detects a middle position between the full close state and full open state of the accelerator pedal is provided. The accelerator opening is estimated on the basis of the middle position. Thus, it is possible to provide a plurality of accelerator pedal positions that can be detected discontinuously.

Figure 6:
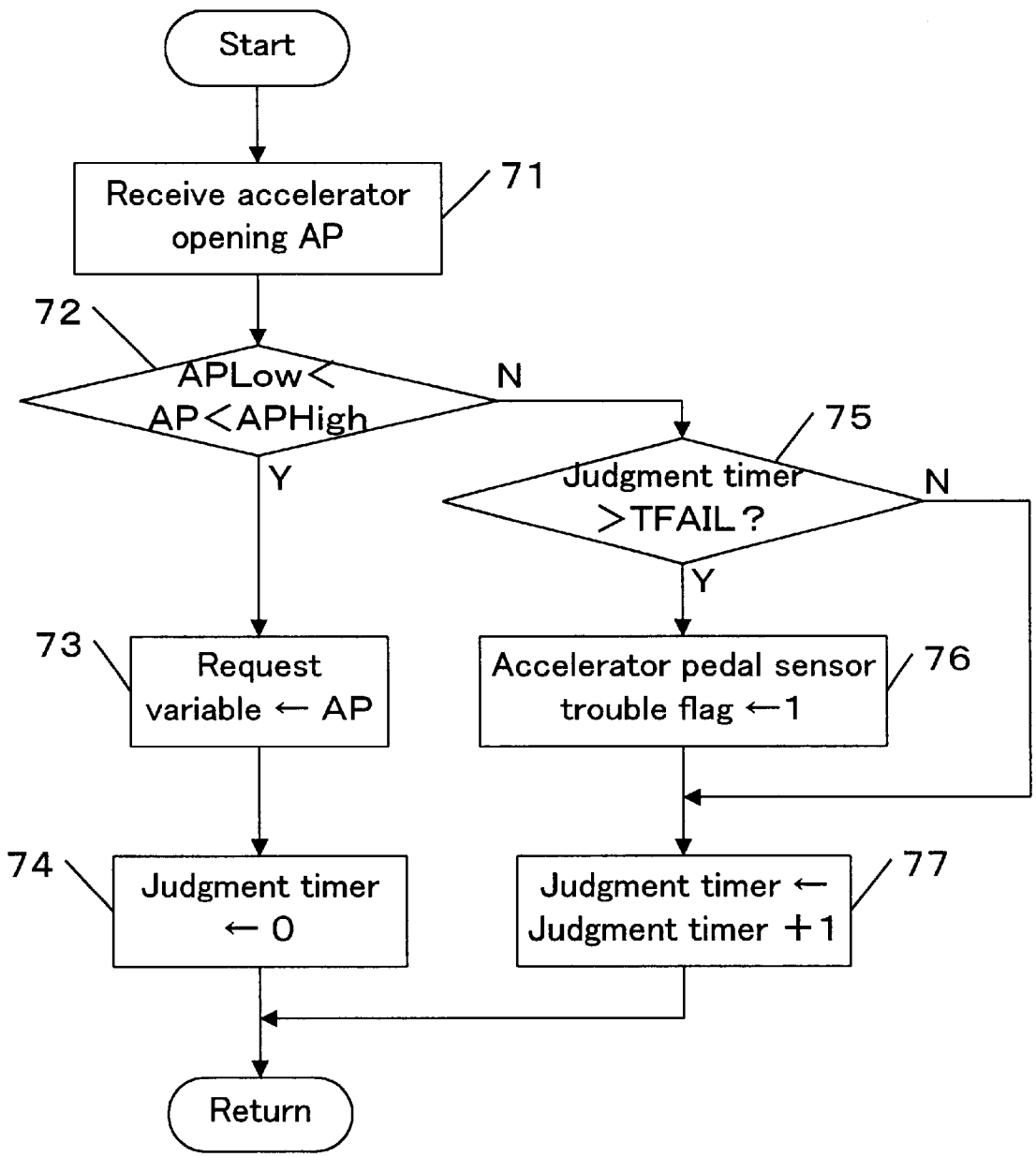
FIG. 6 is a flow chart for detecting trouble of an accelerator pedal sensor according to one embodiment of the invention.

FIG. 6 shows a flow chart showing the process for detecting trouble at the accelerator pedal sensor to be carried out by the accelerator pedal sensor trouble detector 47. It also shows the process for calculating demand variables to be carried out by the accelerator pedal opening calculator 48. This routine is practiced at constant time intervals (for example, ten ms). Here, the initial value of the accelerator pedal sensor trouble flag is supposed to be zero.

At step 71, an accelerator opening AP is received from the driving conditions detecting part 35. Advancing to step 72, if the received accelerator opening AP is in a previously determined range (between APLow and APHigh, here, for example, APLow=0, APHigh=80), it is determined that no trouble has arisen in the accelerator pedal sensor, and the received accelerator opening AP is set to the demand variable (73). Advancing to step 74, the judgment timer is initialized.

At step 72, if the received accelerator opening AP is not in the predetermined range, a judgement is made as to whether or not the judgment timer has elapsed the previously determined term (TFAIL) (75). If the previously determined time has elapsed (for example, the value of the judgment timer is 10), it is judged that trouble has arisen in the accelerator pedal sensor, and a value of 1 is set at the accelerator pedal sensor trouble flag (76). At step 75, if the previously determined time has not elapsed, the step advances to step 77. At step 77, the judgment timer increments. When no accelerator opening is outputted from the accelerator pedal sensor through a certain term, no numerical value is set to the accelerator opening AP. In this case, existence of trouble is determined.

In this embodiment, when the accelerator opening AP is in the above described predetermined range, it is determined that no trouble exists, but the above described predetermined range is not limited to the above described example of a numerical value. Alternatively, the predetermined range may be changed according to the engine rotational speed NE.

Figure 7:
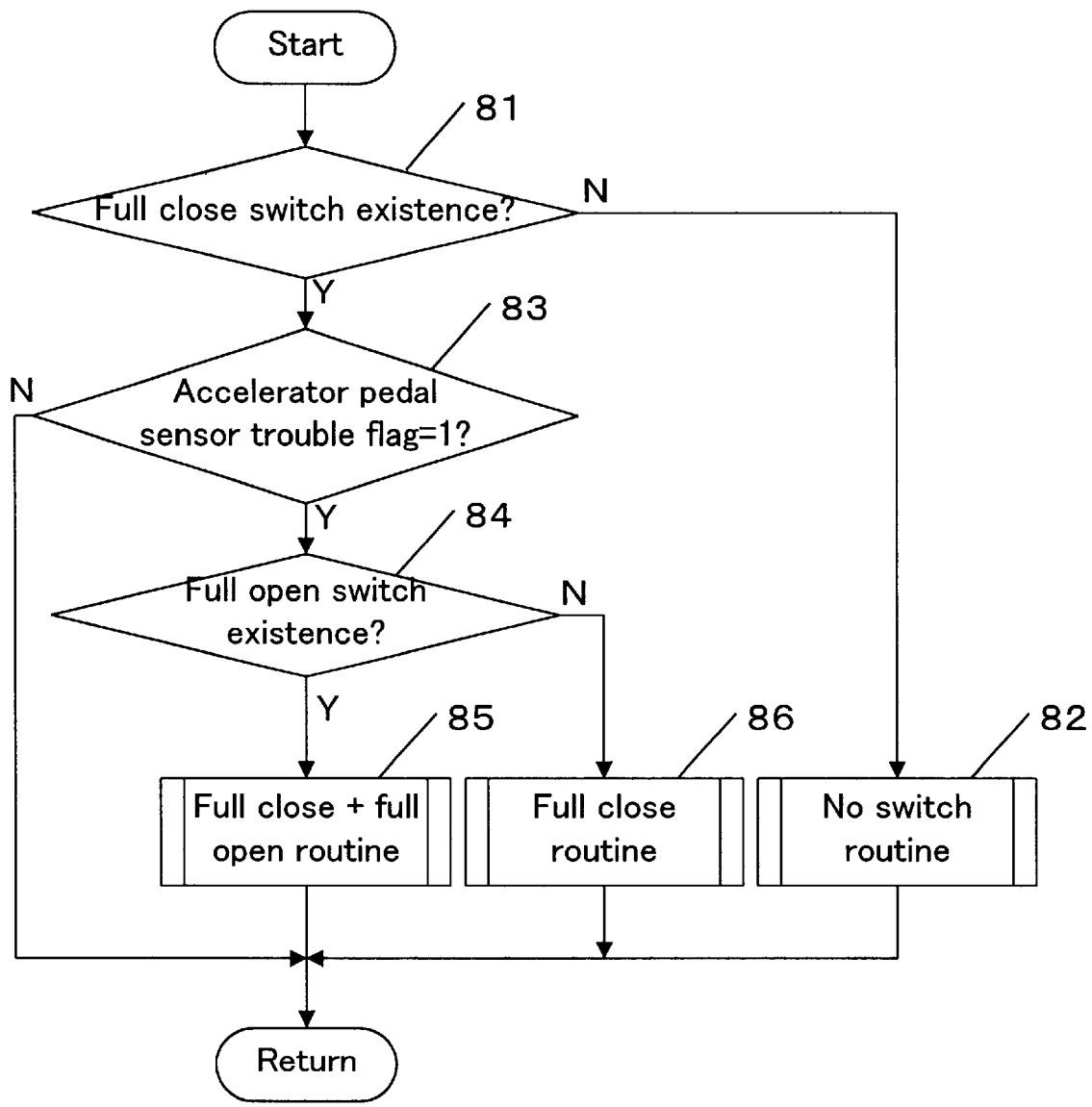
FIG. 7 is a flow chart showing an estimating method of an accelerator opening according to one embodiment of the invention.

FIG. 7 shows a flow chart for estimating an accelerator opening, which is carried out by the accelerator pedal opening estimator 49. This routine is carried out at a constant time interval (for example, every 100 mille-second).

Usually, a full close switch is provided to the accelerator pedal for detecting the idling state. The full open switch may or may not be provided. In this embodiment, it is assumed that the full close switch as well as the full open switch is provided.

At step 81, a judgement is made as to whether or not a full close switch is provided to the accelerator pedal. If no full close switch is provided, the step advances to step 82, and the routine of no switch (FIG. 10) is practiced.

At step 81, if a full close switch is provided to the accelerator pedal, a judgement is made as to whether or not a value of 1 is set at the accelerator pedal sensor trouble flag (83). If a value of 1 is not set at the accelerator pedal sensor trouble flag, it means that no trouble has arisen in the accelerator pedal sensor. The process exits this routine.

If a value of 1 is set at the accelerator pedal sensor trouble flag, a judgement is made as to whether or not a full open switch exists (84). If a full open switch is provided, the full close+full open routine (FIG. 8) is practiced, which estimates the accelerator opening by using both of the full close and full open switches (85). If no full open switch is provided, the full close routine (FIG. 9) is carried out, which estimates the accelerator opening only by using the full close switch (86).

Figure 8:
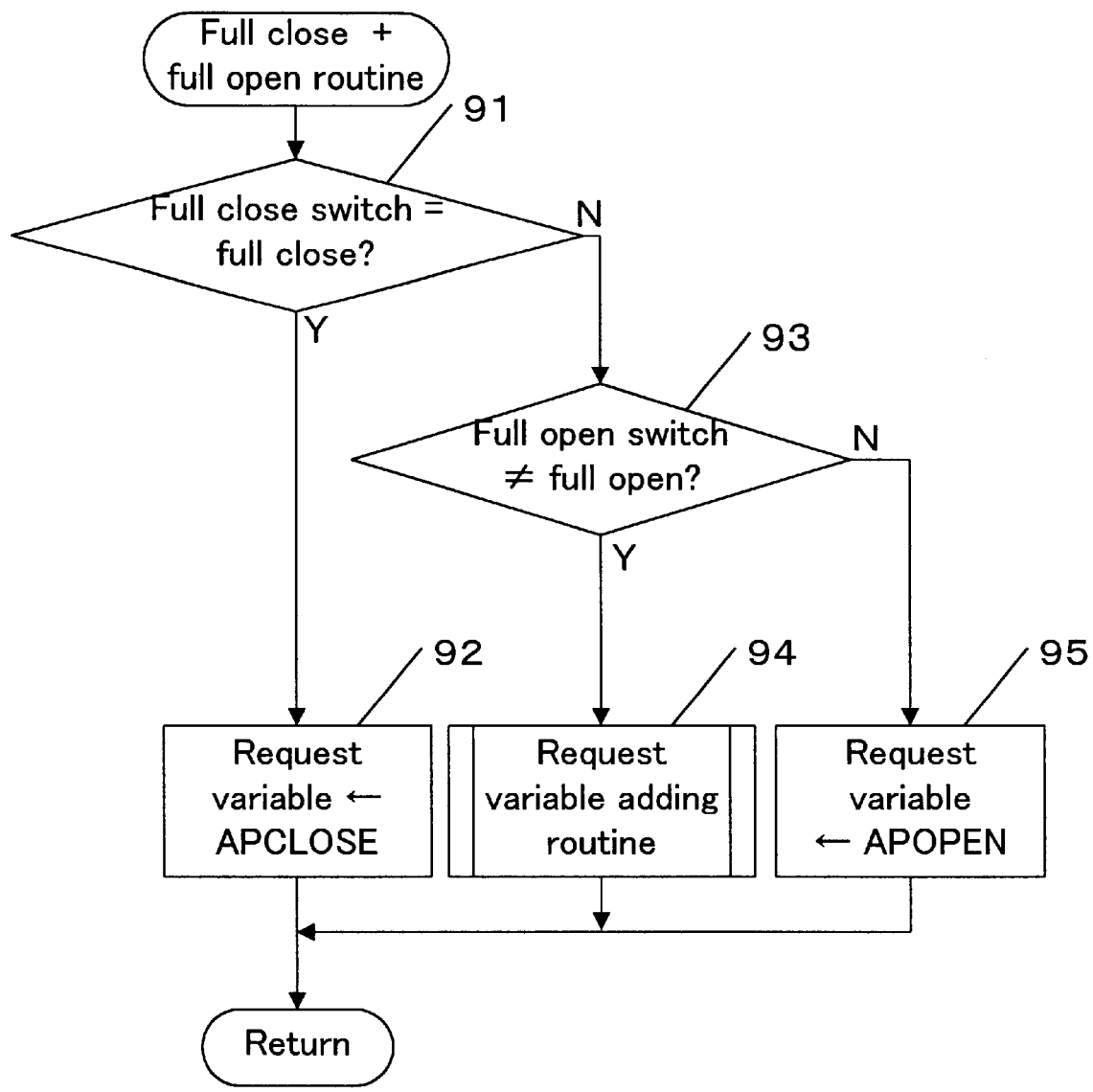
FIG. 8 is a flow chart for estimating an accelerator opening using both a full close switch and a full open switch according to one embodiment of the invention.

In FIG. 8, a flow chart of the full close+full open routine is shown. At step 91, a judgement is made as to whether or not the full close switch is in the full closed state. If it is in the full closed state, the accelerator opening is set to a previously determined value APCLOSE (92). The above described value APCLOSE is a value corresponding to an accelerator opening of the full close (for example, zero degree) or nearly full close.

At step 91, if the full close switch is not in the full closed state, a judgement is made as to whether or not the full open switch is in the full open state (93). If the full open switch is not in the full open state, it means that the accelerator pedal is in the state between the full close and full open. In this case, the demand variable adding routine (FIG. 11) is carried out (94).

At step 93, if the full open switch is in the full open state, the accelerator opening is set at the previously determined value APOPEN (95). The value APOPEN is a value corresponding to an accelerator opening of the full open or nearly full open (for example, 80 degrees).

Figure 9:
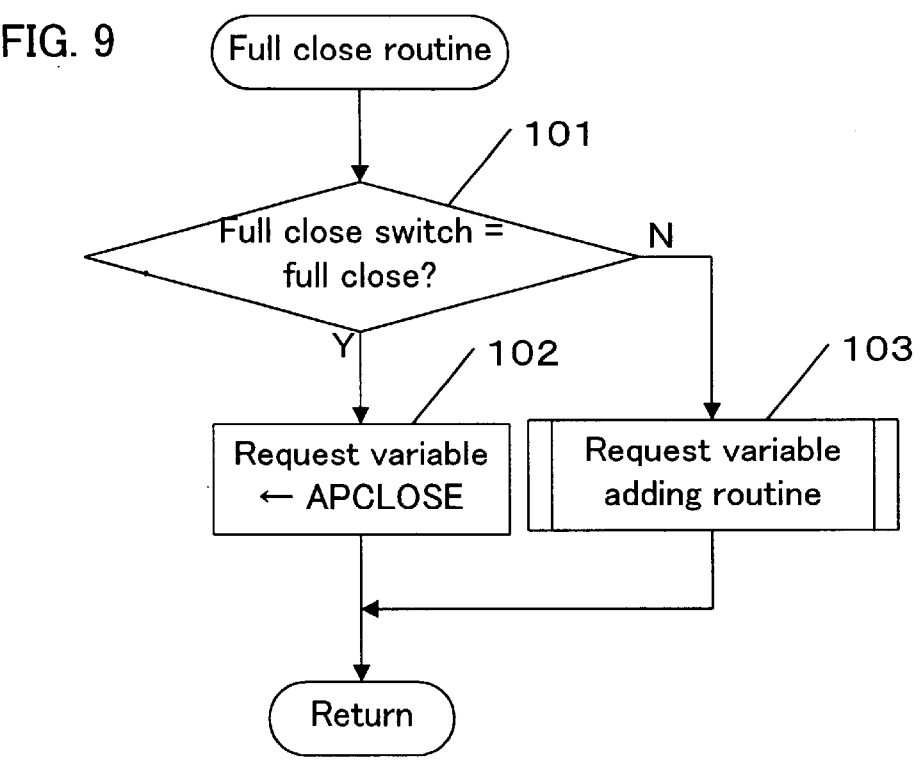
FIG. 9 is a flow chart for estimating an accelerator opening only using the full close switch according to one embodiment of the invention.

In FIG. 9, a flow chart of the full close routine is shown. At step 101, a judgement is made as to whether or not the full close switch is in the full closed state. If it is in the full closed state, APCLOSE is set at the demand variable (102). If it is not in the full closed state, the accelerator pedal must exist in any position different from the full close, and therefore, the demand variable adding routine (FIG. 11) is carried out (103).

Figure 10:
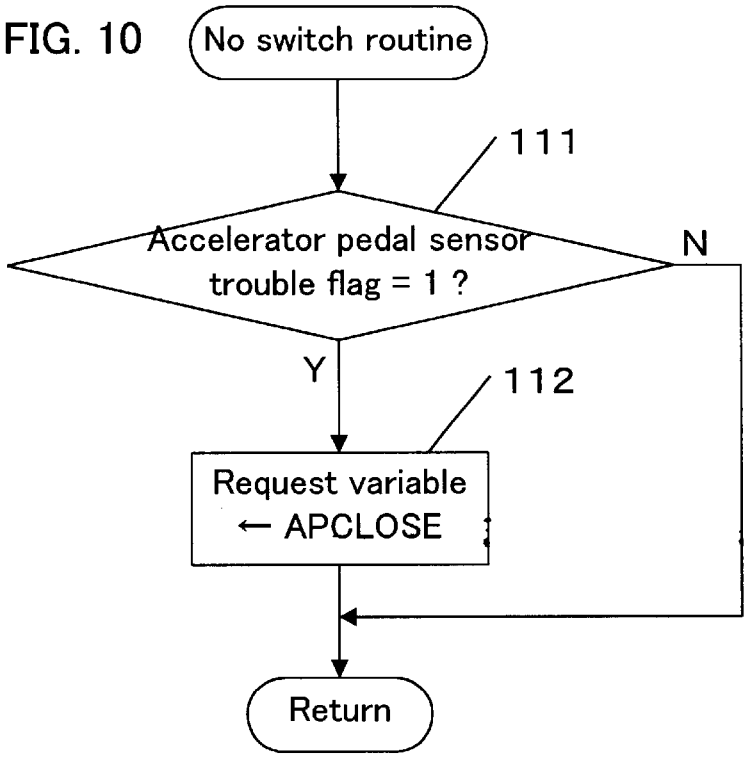
FIG. 10 is a flow chart for estimating the accelerator opening when the full close and full open switches do not exist according to one embodiment of the invention.

In FIG. 10, a flow chart for a no switch routine is shown. At step 111, a judgement is made as to whether or not a value of b 1is set at the accelerator pedal sensor trouble flag. If a value of 1 is not set, it means that no trouble has arisen in the accelerator pedal sensor. The process exits this routine. If a value of 1 is set, it means that trouble has arisen in the accelerator pedal sensor. Advancing to step 112, APCLOSE is set at the demand variable. If no full close switch exists, the accelerator opening cannot be estimated, and therefore, it is impossible to follow the demand from the driver. Accordingly, in such a mode, when trouble has arisen in the accelerator pedal sensor, the accelerator opening is estimated to be the full close, that is, the demand variable is estimated to be zero (or a value of nearly zero).

Figure 11:
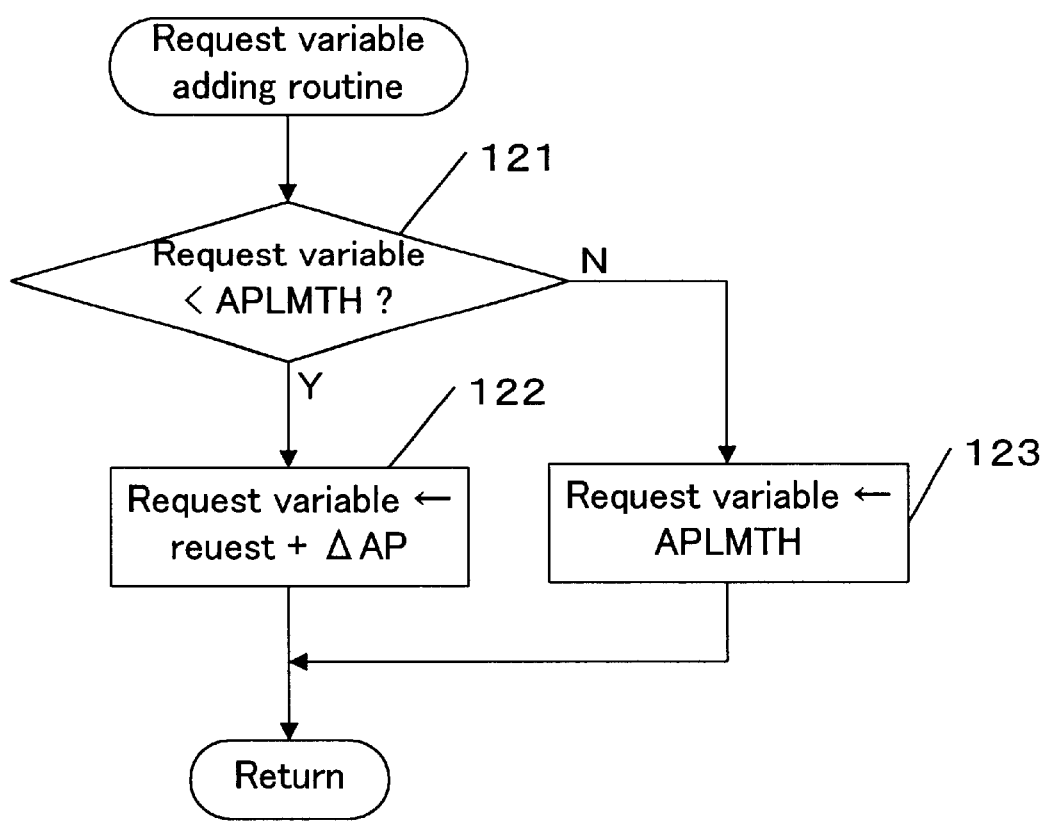
FIG. 11 is a flow chart of a demand variable adding routine according to one embodiment of the invention.

In FIG. 11, a flow chart of the demand variable adding routine is shown. At step 121, a judgement is made as to whether or not the demand variable is less than the previously determined value APLMTH. If the demand variable is less than APLMTH, a predetermined volume ΔAP is added to the demand variable (122). If the demand variable is APLMTH or more, APLMTH is set to the demand variable (123).

Thus, when it is determined that the accelerator pedal is not in the full closed state (when only the full close switch exists) or it is in the state between the full close and full open (when the full close and full open switches exist), the additional processing of ΔAP is carried out to the demand variable if it is smaller than the predetermined value APLMTH. The demand variable is fixed at the predetermined value if it is the predetermined value APLMTH or more. Thus, the accelerator opening is estimated.

FIG. 12 shows the graphs of the stamping stroke of the accelerator pedal, the demand variable determined by the accelerator pedal opening calculator, the states of the full close and full open switches, the demand variable estimated by the above described full close routine, and the demand variable estimated by the full close plus full open routine.

In the graphs in FIG. 12, the horizontal axis shows the elapse of time. The graph 131 shows the transition of the actual depression stroke of the accelerator pedal, that is, the actual accelerator opening. Between time 0 and t1, the accelerator pedal is in the full closed state. Between time t1 and t2, the accelerator pedal is depressed to a state between the full close and full open. Between time t2 and t3, the accelerator pedal is in the full open state. At time t4, the accelerator pedal becomes in the full closed state, again. After that, between time t5 and t6, the accelerator pedal is in the full open state where it is stamped most. At time t6, the accelerator pedal becomes in the full closed state, again.

The graph 132 shows the transition of the accelerator opening that is calculated by the accelerator pedal opening calculator 48 when no trouble has arisen in the accelerator pedal sensor. As apparent from the graph 132, the transition of the accelerator opening calculated as the demand variable follows the depression stroke of the accelerator pedal (graph 131).

The graph 133 shows the on/off state of the full close switch provided on the accelerator pedal. The on state (shown by a level High in the graph) shows a state where the accelerator pedal is fully closed. The off state (shown by a level Low in the graph) shows a state where the accelerator pedal is not fully closed. Between time 0 and t1, t4 and t5, and t6 and t7, the accelerator pedal is in the fully closed state as shown by the graph 131, and therefore, the full close switch is in the on state. During the other time zones, the full close switch is in the off state.

The graph 134 shows the on/off state of the full open switch provided to the accelerator pedal. The on state (shown by the level High in the graph) shows a state where the accelerator pedal is fully open. The off state (shown by the level Low in the graph) shows a state where the accelerator pedal is not fully open. Between time t2 and t3 and time t5 and t6, the accelerator pedal is in the full open state as shown in the graph 131, and therefore, the full open switch is in the on state. In the other time zones, the full open switch is in the off state.

The graph 135 shows the transition of the demand variable that is estimated by the full close routine. Between time 0 and t1, the full close switch is in the on state, and responding thereto, the accelerator opening is set at APCLOSE. Between time t1 and t2, the full close switch is in the off state. Responding thereto, the above described demand variable adding routine is carried out, and a predetermined volume ΔAP (for example, five degrees) is added to the demand variable (initial value is APCLOSE) for each predetermined time (for example, 100 ms). When the demand variable reaches a previously determined value APLMTH (which is a value smaller than APOPEN and larger than APCLOSE, for example, 40 degrees), the demand variable is fixed at the predetermined value APLMTH. The reason is that if ΔAP is added until the accelerator opening becomes the full open, there is a possibility of increasing of the error with the actual accelerator pedal opening.

Between time t2 and t3, the accelerator opening is in the full open state. However, because a full open switch is not provided, the full open state cannot be detected. Accordingly, the accelerator opening remains to be kept at the predetermined value APLMTH. Between time t4 and t5, when the accelerator opening is in the full closed state, the full close switch is in the on state. Responding thereto, the demand variable is set at APCLOSE, again. At time t5, the full close switch becomes off, again. Responding thereto, the demand variable adding routine is carried out, again, and the predetermined volume ΔAP is added to the demand variable (initial value is APCLOSE) for each predetermined time. At time t6, the full close switch becomes on, again. Responding thereto, the demand variable is set at APCLOSE.

The graph 136 shows the transition of the demand variable calculated by the full close+full open routine. Between time t0 and t1, the full close switch is on. Responding thereto, the demand variable is set at APCLOSE. Between time t1 and t2, the full close switch is off, and the full open switch is also off. This shows that the accelerator opening is in a state between the full close and full open. The demand variable adding routine is carried out, and the predetermined volume ΔAP is added to the demand variable (initial value is APCLOSE) for each predetermined time until the demand variable reaches the predetermined value APLMTH. Between time t2 and t3, the full open switch is on. Responding thereto, the demand variable is set at APOPEN.

Between time t3 and t4, the full open switch is off, and furthermore, the full close switch is also off. This shows that the accelerator opening is in a state between the full close and full open. The demand variable is kept at the predetermined value APLMTH.

Between time t4 and t5, the full close switch is on. Responding thereto, the demand variable is set at APCLOSE. At time t5, the full close switch becomes off, and the full open switch becomes on. Responding thereto, the demand variable is set at APOPEN. This is kept until the full open switch becomes off.

At time t6, when the accelerator pedal becomes in the full closed state, again, the full close switch becomes on, and responding thereto, the demand variable is set at APCLOSE.

As apparent from the graphs 135 and 136, it is possible to estimate a demand variable nearly equal to the demand of the driver. Thus, even when trouble has arisen in the accelerator pedal sensor, a emergency driving is possible, in which the drivability is ensured to some extent. It is apparent that when both the full open and full close switches are provided, a better drivability than that available with the full close switch alone can be realized.

While the invention was described in terms of specific embodiments, the scope of the invention is not limited to those embodiments.

What is claimed is:

1. A controller for an internal combustion engine including a detector for detecting a demand variable from a driver, a calculator for calculating air volume to be supplied to the internal combustion engine according to said detected demand variables, and a unit for controlling the engine based on the calculated intake air volume, said controller being configured to:

keep the intake air volume to said internal combustion engine constant when a system controlling the intake air volume to said internal combustion engine has trouble;

calculate a emergency driving control variable according to said detected demand variable; and control the driving of the vehicle according to said calculated emergency driving control variable;

wherein said emergency driving control variable is a control variable different from said intake air volume.

2. The controller of an internal combustion engine according to claim 1, wherein said emergency driving control variable is a target air/fuel ratio.

3. The controller of an internal combustion engine according to claim 2, further comprising a emergency driving air/fuel ratio map based on the demand variable and the rotational speed of said internal combustion engine, wherein the controller is configured to:

detect the rotational speed of said internal combustion engine; and retrieve said emergency driving air fuel ratio map to determine said target air fuel ratio on the basis of said detected demand variable and said detected rotational speed.

4. The controller of an internal combustion engine according to claim 3, wherein said emergency driving air fuel ratio map is defined so that setting of a lean area be less than that of a normal driving air fuel ratio map.

5. The controller of an internal combustion engine according to claim 1, wherein said demand variable is an opening of an accelerator pedal.

6. The controller of an internal combustion engine according to claim 1, wherein said demand variable is a required torque based on a rotational speed of said combustion engine and an opening of the accelerator pedal.

7. The controller of an internal combustion engine according to claim 1, further comprising a throttle valve actuator which controls the intake air volume to said internal combustion engine by controlling the opening of a throttle valve.

8. The controller of an internal combustion engine according to claim 7, wherein the intake air volume to said internal combustion engine is kept constant by fixing the opening of said throttle valve in the full close or nearly full close state when it is determined that trouble has arisen in a system which controls the intake air volume to said internal combustion engine.

9. The controller of an internal combustion engine according to claim 1, further comprising:

an accelerator pedal sensor which continuously detects the position of an accelerator pedal; and an accelerator pedal switch which discontinuously detects the position of said accelerator pedal, wherein it is arranged that said demand variable is calculated on the basis of the opening of the accelerator pedal detected by said accelerator pedal sensor when it is determined that said accelerator pedal sensor is not in trouble, and that said demand variable is estimated on the basis of the position of the accelerator pedal detected by said accelerator pedal switch when it is determined that said accelerator pedal sensor is in trouble.

10. The controller of an internal combustion engine according to claim 9, wherein said accelerator pedal switch comprises a full close switch which detects a full close state of the accelerator pedal.

11. The controller of an internal combustion engine according to claim 9, wherein said accelerator pedal switch comprises a full close switch and a full open switch which detect the full close and full open states of the accelerator pedal.

12. The controller of an internal combustion engine according to claim 1, wherein said internal combustion engine includes a gasoline internal combustion engine of a cylinder injection system.

13. A control method of an internal combustion engine, including the steps of detecting a demand variable corresponding to demand from a driver, controlling an intake air volume to the internal combustion engine according to said detected demand, determining whether a system controlling the intake air volume to said internal combustion engine has trouble, and practicing emergency driving when said system has trouble, wherein said step of practicing emergency driving comprises the steps of;

keeping the intake air volume to said internal combustion engine constant;

calculating a emergency driving control variable according to said detected demand variable; and controlling driving of a vehicle according to said calculated emergency driving control variable, wherein said emergency driving control variable is a control variable different from said intake air volume.

14. The control method of an internal combustion engine according to claim 13, wherein said emergency driving control variable is a target air fuel ratio.

15. The control method of an internal combustion engine according to claim 13, further comprising the steps of:

providing a emergency driving air fuel ratio map based on the demand variable and the rotational speed of said internal combustion engine;

detecting the rotational speed of said internal combustion engine; and determining said target air fuel ratio on the basis of said detected demand variable and said detected rotational speed, from said emergency driving air fuel ratio map.

16. The control method of an internal combustion engine according to claim 13, wherein said demand variable is an opening of an accelerator pedal sensor.

17. The control method of an internal combustion engine according to claim 13, wherein said step of controlling the intake air volume to the internal combustion engine further comprises a step of controlling an opening of a throttle valve.

18. The control method of an internal combustion engine according to claim 17, wherein said step of keeping the intake air volume to said internal combustion engine constant further comprises a step of fixing the opening of said throttle valve in a full close or nearly full close state.

19. The control method of an internal combustion engine according to claim 13, wherein said step of detecting the demand variable further comprises the step of:

continuously detecting the position of an accelerator pedal;

discontinuously detecting the position of said accelerator pedal;

calculating said demand variable on the basis of the opening of the accelerator pedal detected by said accelerator pedal sensor, when said accelerator pedal sensor is not in trouble; and estimating said demand variable on the basis of the position of accelerator pedal detected by said accelerator pedal switch, when it is determined that said accelerator pedal sensor has trouble.

* * * * *